(12) United States Patent
Hong et al.

(10) Patent No.: US 8,296,896 B2
(45) Date of Patent: Oct. 30, 2012

(54) WIPER DRIVING APPARATUS FOR AUTOMOBILE

(75) Inventors: Sung-Jin Hong, Incheon (KR); Kwang-Hyun Jung, Incheon (KR)

(73) Assignee: Dongyang Mechatronics Corp, Incheon (KR)

( * ) Notice: Subject to any disclaimer, the term of this patent is extended or adjusted under 35 U.S.C. 154(b) by 977 days.

(21) Appl. No.: 12/295,293

(22) PCT Filed: Aug. 10, 2006

(86) PCT No.: PCT/KR2006/003131
§ 371 (c)(1),
(2), (4) Date: Sep. 30, 2008

(87) PCT Pub. No.: WO2007/136149
PCT Pub. Date: Nov. 29, 2007

(65) Prior Publication Data
US 2009/0113652 A1    May 7, 2009

(30) Foreign Application Priority Data

May 24, 2006  (KR) .................. 10-2006-0046523

(51) Int. Cl.
*H01H 19/00* (2006.01)
*B60S 1/08* (2006.01)
*B60S 1/06* (2006.01)
(52) U.S. Cl. .............. 15/250.17; 15/250.3; 318/DIG. 2; 318/445; 200/19.2; 200/501
(58) Field of Classification Search .................. 15/250.3, 15/250.31, 250.16, 250.17; 200/500, 501, 200/19.01, 19.2, 19.07, 6 R, 11 R, 11 G; 318/DIG. 2, 443, 444, 445
See application file for complete search history.

(56) References Cited

U.S. PATENT DOCUMENTS

| 4,700,026 A | * | 10/1987 | Kamiyama et al. | ........ | 200/19.07 |
| 5,422,449 A | * | 6/1995 | Kano et al. | .................. | 200/19.01 |
| 5,907,885 A | | 6/1999 | Tilli et al. | | |
| 6,255,605 B1 | | 7/2001 | Leiter et al. | | |

FOREIGN PATENT DOCUMENTS

| EP | 0398630 | * 11/1990 |
| JP | 2005-155903 | 6/2005 |
| KR | 1020050111816 A | 11/2005 |

* cited by examiner

*Primary Examiner* — Gary Graham
(74) *Attorney, Agent, or Firm* — Ladas & Parry LLP

(57) ABSTRACT

Provided is a wiper driving apparatus for an automobile. The wiper driving apparatus includes: a housing; a driving motor; a worm wheel installed in the housing to be rotated by the driving motor, connected to a wiper arm, and having protrusions formed on a surface thereof; and a clutch member eccentric with respect to the center of the worm wheel to be rotatably installed in the housing such that power supply to the driving motor is selectively turned on or off according to the position of the rotating clutch member relative to the housing, wherein the clutch member has an engagement unit which is caught by the protrusions of the worm wheel when the worm wheel is rotated in a first direction, and is not caught by the protrusions of the worm wheel when the worm wheel is rotated in a second direction. Accordingly, the wiper driving apparatus enables the clutch member to be disposed within the radius of rotation of protrusions without deviating from its normal track although the protrusions are rotated in a reverse direction.

10 Claims, 10 Drawing Sheets

WIPER DRIVING APPARATUS FOR AUTOMOBILE

TECHNICAL FIELD

The present invention relates to a wiper driving apparatus for an automobile, and more particularly, to a wiper driving apparatus for an automobile, which can prevent damage to an internal switch and an abnormal operation even when a wiper rotates in a reverse direction.

BACKGROUND ART

In general, windshield wipers for automobiles include a wiper blade removing foreign substances from a windshield of an automobile, a wiper arm connected to the wiper blade, and a driving unit rotating the wiper arm. The driving unit includes a driving motor, a worm wheel cooperating with the driving motor to rotate the wiper arm, and a park switch directly installed on the worm wheel and returning the wiper to a park position by supplying power to the driving motor even when the ignition is turned off. The park switch continuously supplies power to the driving unit when the wiper blade is not returned to the park position although the main power of the automobile is turned off, and discontinues the power supply to the driving unit when the wiper blade is returned to the park position.

When the windshield of the automobile is covered with snow and the main power of the automobile is turned off, the wiper blade is forced to return to the park position by the park switch but may fail to do so due to the snow. In this case, power is continuously supplied to the driving unit to rotate the wiper blade.

In particular, even when the wiper blade is stopped near the park position, power is continuously supplied to the driving unit. Thus, the wiper arm is elastically deformed, that is, is slightly bent, and does not reach the park position, and only the park switch is in an off state. When no power is supplied to the driving unit, the wiper arm rotates the driving unit in a reverse direction due to its elastic restoring force, and the park switch changes to an on state such that power is supplied to the driving unit again. Thus, the driving unit rotates slightly, and the park switch changes to the off state again. While the park switch repeatedly changes between the on and off states, a contact portion of the park switch may cause a spark, thereby damaging the park switch.

DISCLOSURE OF INVENTION

Technical Problem

Such operation is described in detail in Korean Patent Publication No. 10-2005-0111816, entitled 'Auto Stop System for Vehicle Wiper'.

Meanwhile, in an effort to prevent chattering caused by the repetitive changes between the on and off states, U.S. Pat. No. 6,255,605 discloses a windscreen wiper drive device with a park position switch, which is illustrated in FIGS. 1 and 2. In the conventional windscreen wiper drive device, a park switch is separated from a worm wheel 3 by a clutch member 26 and the worm wheel 3 and the clutch member 26 engage with each other using a protrusion 30 such that the park switch can operate only in a rotation direction of a driving motor (not shown). As a result, even though a wiper arm is deformed and the driving motor is reversed, only the worm wheel 3 is reversed whereas the clutch member 26 is not moved.

When the protrusion 30 is rotated in a direction 35 in which the driving motor rotates, the protrusion 30 contacts switch flaps 27 and 28 of the clutch member 26 to rotate the clutch member 26 from side to side and turn on or off the power supply to the driving motor.

In detail, when the main power of the vehicle is turned off and a wiper blade (not shown) is not in a park position, power is continuously supplied to the driving motor. Then, the protrusion 30 formed on the worm wheel 3 contacts the switch flap 27, thereby rotating the clutch member 26 clockwise, discontinuing the power supply to the driving motor, and stopping the wiper blade. In this state, although the wiper arm is deformed and the worm wheel 3 is rotated in a reverse direction, only the protrusion 30 retreats back and the clutch member 26 pushed clockwise by the protrusion 30 is not moved.

However, the conventional windscreen wiper drive device has the following problems.

The conventional windscreen wiper drive device is designed considering the case where the worm wheel 3 is instantly reversed due to snow when the wiper blade is placed near the park position, but not considering the case where the worm wheel 3 is reversed in particular conditions. For example, when the driving motor, which normally operates with the wiper blade in the park position, malfunctions suddenly and the protrusion 30 is rotated in a reverse direction 36 as shown in FIG. 2, the protrusion 30 rotates the switch flap 27, thereby causing the clutch member 26 to deviate from a normal track.

In this case, interference between the clutch member 26 and the worm wheel 3 or other parts occurs, resulting in damage to a weaker part, for example, a shaft of the clutch member 26.

Also, since the clutch member 26 is not disposed within the radius of rotation where the clutch member 26 can contact the protrusion 30, normal power supply is hard to achieve although the worm wheel 3 is rotated.

Technical Solution

The present invention provides a wiper driving apparatus for an automobile, which enables a clutch member to be disposed within the radius of rotation of protrusions without deviating from its normal track although the protrusions are rotated in a reverse direction.

According to an aspect of the present invention, there is provided a wiper driving apparatus for an automobile, comprising: a housing; a driving motor; a worm wheel installed in the housing to be rotated by the driving motor, connected to a wiper arm, and having protrusions formed on a surface thereof; and a clutch member that is eccentric with respect to the center of the worm wheel and is rotatably installed in the housing such that power supply to the driving motor is selectively turned on or off according to the position of the rotating clutch member relative to the housing, wherein the clutch member has an engagement unit which is caught by the protrusions of the worm wheel when the worm wheel is rotated in a first direction, and is not caught by the protrusions of the worm wheel when the worm wheel is rotated in a second direction.

The engagement unit may comprise engagement jaws caught by the protrusions of the worm wheel when the worm wheel is rotated in the first direction, and elastic parts pressed and deformed by the protrusions of the worm wheel when the worm wheel is rotated in the second direction to permit the rotation of the protrusions.

The engagement jaws may have triangular sections.

The wiper driving apparatus may further comprise rotation angle limiting means for limiting the angle of rotation of the clutch member relative to the housing.

The rotation angle limiting means may comprise: a stopper disposed on the worm wheel; a first projection disposed on the clutch member and limiting the angle of the clutch member rotated in the first direction by being caught by the stopper of the worm wheel while the clutch member is rotated in the first direction relative to the housing; and a second projection disposed on the clutch member and limiting the angle of the clutch member rotated in the second direction by being caught by the stopper of the worm wheel while the clutch member is rotated in the second direction relative to the housing.

The rotation angle limiting means may comprise: a first catching projection protruding from the housing to catch the clutch member that is rotated in the first direction; and a second catching projection protruding from the housing to catch the clutch member that is rotated in the second direction.

Advantageous Effects the wiper driving apparatus enables the clutch member to be disposed within the radius of rotation of protrusions without deviating from its normal track although the protrusions are rotated in a reverse direction.

DESCRIPTION OF DRAWINGS

The above and other features and advantages of the present invention will become more apparent by describing in detail exemplary embodiments thereof with reference to the attached drawings in which.

BEST MODE

The present invention will now be described more fully with reference to the accompanying drawings, in which exemplary embodiments of the invention are shown.

Figure 1:
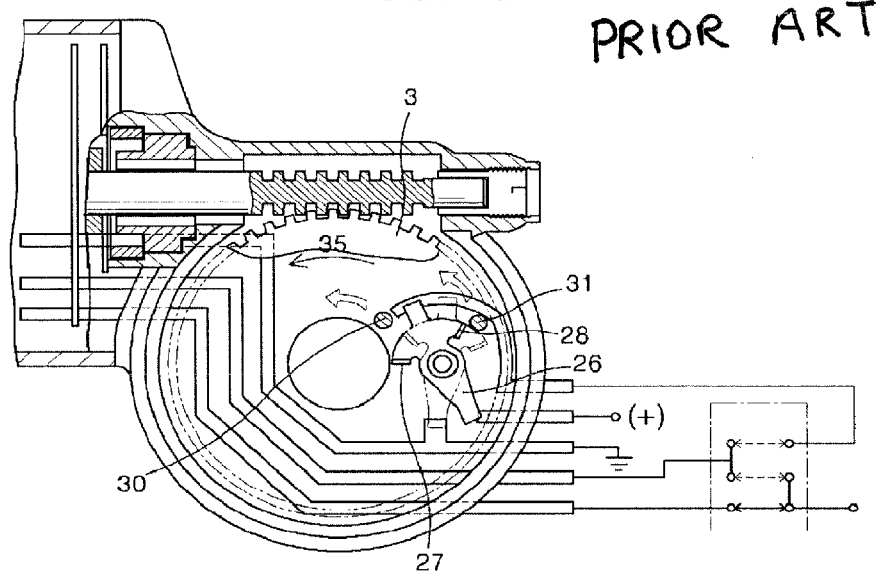
FIGS. 1 and 2 are cross-sectional views of a conventional wiper driving apparatus.
Figure 2:
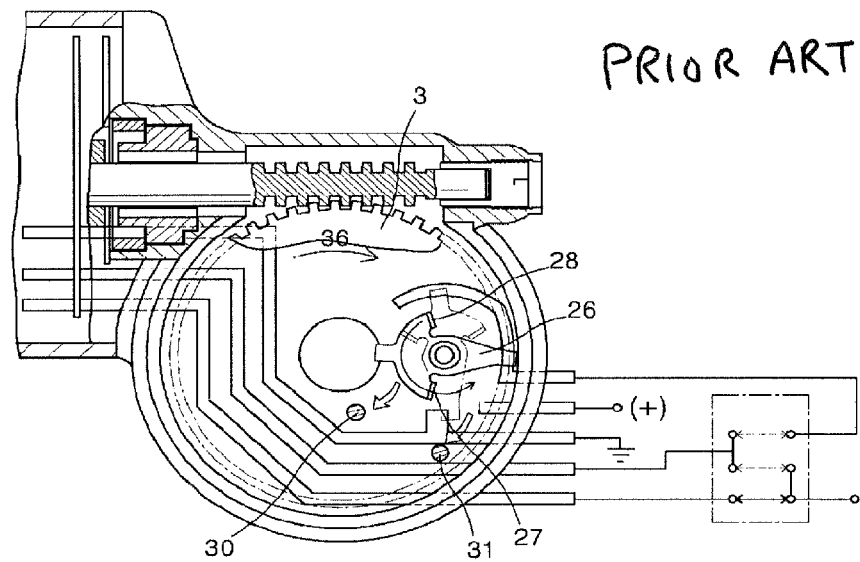
Figure 3:
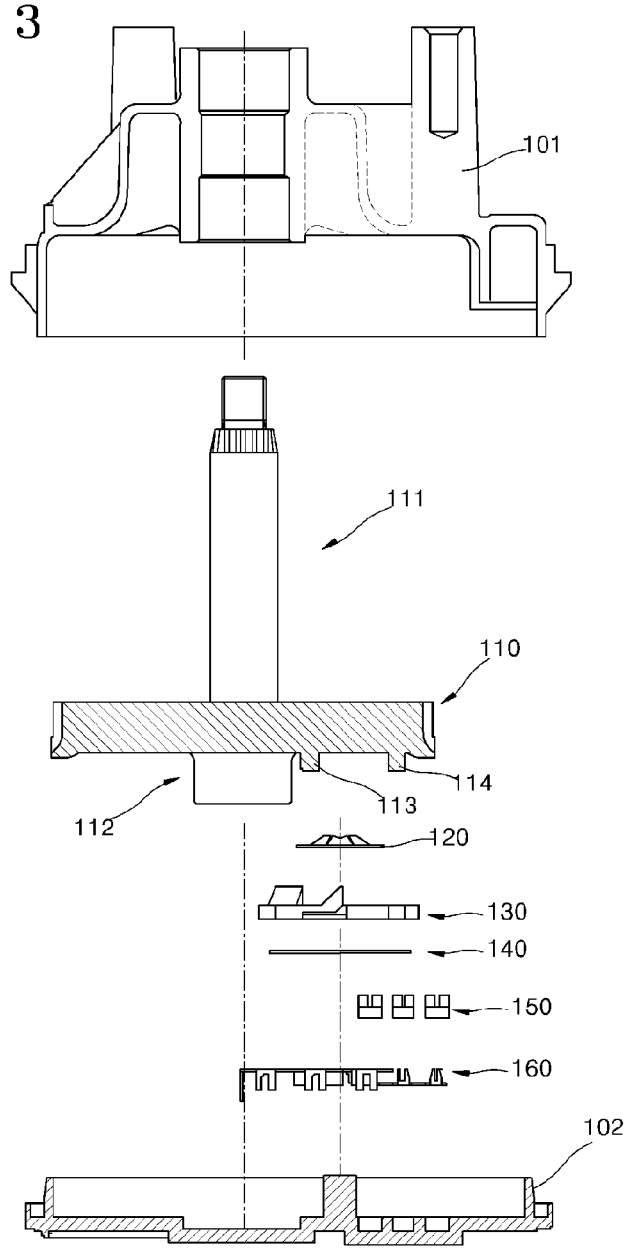
FIG. 3 is an exploded view of a wiper driving apparatus according to an embodiment of the present invention.
Figure 4:
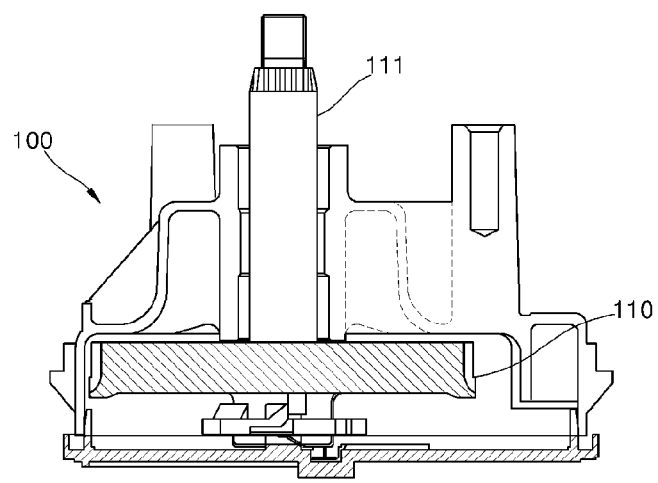
FIG. 4 is a cross-sectional view of the assembled wiper driving apparatus of FIG. 3.
Figure 5A:
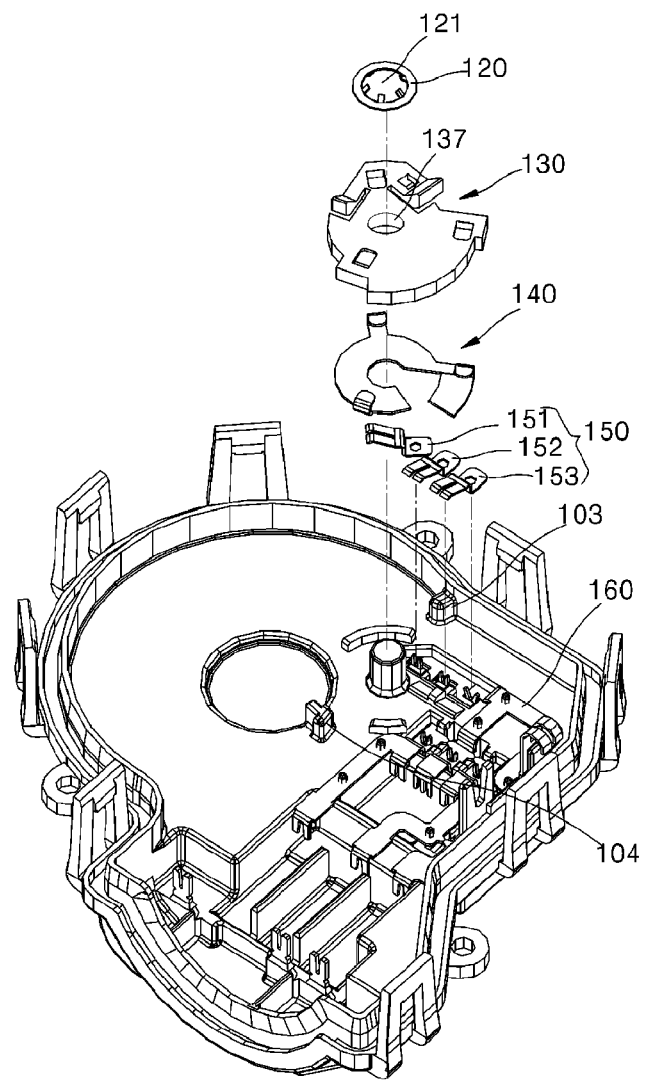
FIGS. 5A and 5B are respectively an exploded perspective view and a plan view of the wiper driving apparatus of FIG. 3.
Figure 5B:
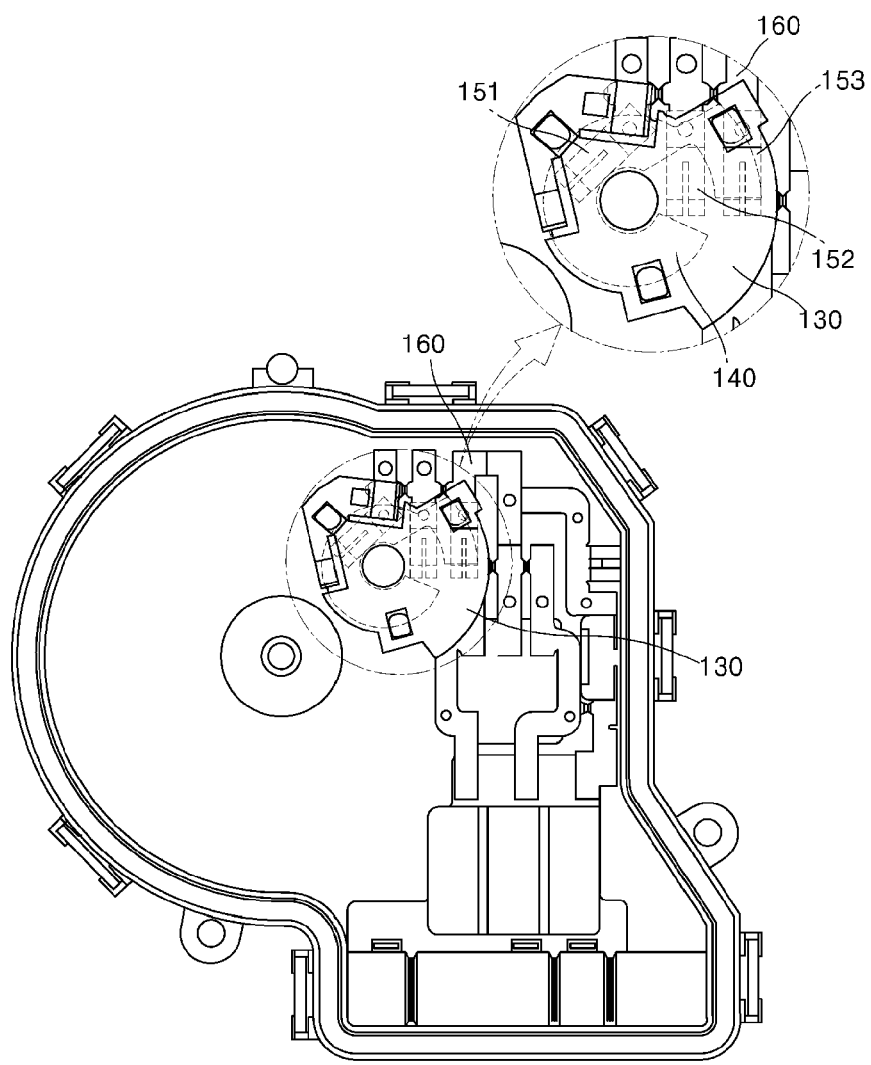
Figure 6A:
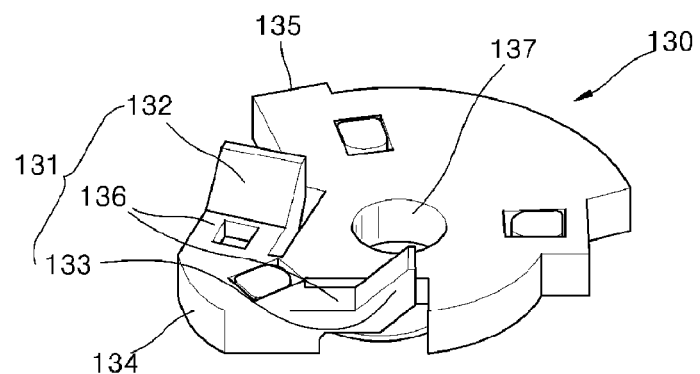
FIGS. 6A and 6B are respectively a perspective view and a plan view of a clutch member of the wiper driving apparatus of FIG. 3, according to an embodiment of the present invention.
Figure 6B:
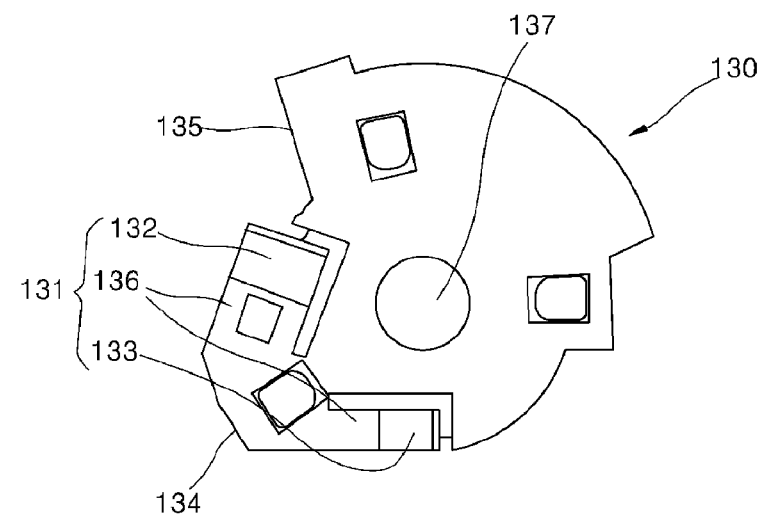

FIG. 3 is an exploded view of a wiper driving apparatus according to an embodiment of the present invention. FIG. 4 is a cross-sectional view of the assembled wiper driving apparatus of FIG. 3. FIGS. 5A and 5B are respectively an exploded perspective view and a plan view of the wiper driving apparatus of FIG. 3. The wiper driving apparatus for an automobile includes a housing 100, a worm wheel 110, a clutch member 130, a relay plate 140, a contact terminal 150, and a lead terminal 160.

The housing 100 on which a motor (not shown) is mounted and in which means for providing the driving force of the motor to an external wiper arm (not shown) is installed includes a housing body 101 and a cover 102. A first catching projection 103 protrudes from the cover 102 to catch the clutch member 130 that is rotated in a first direction, and a second catching projection 104 protrudes from the cover 102 to catch the clutch member 130 that is rotated in a second direction.

The worm wheel 110 is installed on the housing body 101, and is rotated while being engaged with a worm gear (not shown) that transmits the driving force of the motor. A driving shaft 111 is mounted in the center of a first surface of the worm wheel 110 and passes through the housing body 101 to be connected to the external wiper arm, and a stopper 112 extends from the center of a second surface of the worm wheel 110 and supports the worm wheel 110 so that the worm wheel 110 can be rotated in the housing 100. The worm wheel 110 is rotatably supported by the driving shaft 111 and the stopper 112 passing through its center. Also, two protrusions 113 and 114 are formed on the worm wheel 110.

The stopper 112 not only supports the worm wheel 110 but also limits the angle of rotation of the clutch member 130. The outer diameter of the stopper 112 varies depending on the angle of rotation of the clutch member 130 limited by the stopper 112. That is, as the rotation angle of the clutch member 130 limited by the stopper 112 increases, the outer diameter of the stopper 112 increases, and as the rotation angle of the clutch member 130 limited by the stopper 112 decreases, the outer diameter of the stopper 112 decreases.

The clutch member 130 is rotatably fixed between the worm wheel 110 and the cover 102, and the axis of the clutch member 130 is eccentric with respect to the axis of the worm wheel 110. The clutch member 130 is made of an elastic plastic material. The clutch member 130 includes an engagement unit 131 (not shown in FIGS. 3-5!) that is located within the radius of rotation of the protrusions 113 and 114 of the worm wheel 110 to engage with the protrusions 113 and 114.

The engagement unit 131 includes engagement jaws 132 and 133 (not shown in FIGS. 3-5!) caught by the protrusions 113 and 114 of the worm wheel 110 when the worm wheel 110 is rotated in the first direction, and elastic parts 136 pressed and deformed by the protrusions 113 and 114 of the worm wheel 110 when the worm wheel 110 is rotated in the second direction to permit the rotation of the protrusions 113 and 114.

The engagement jaws 132 and 133 have right triangular sections. The protrusions 113 and 114 rotated in the first direction are caught by vertical walls of the engagement jaws 132 and 133, and the protrusions 113 and 114 rotated in the second direction are allowed to travel past the triangular inclined surfaces of the engagement jaws 132 and 133.

Also, a first projection 134 and a second projection 135 (not shown in FIGS. 3-5!) acting as rotation angle limiting means for limiting the angle of rotation of the stopper 112 are formed on the clutch member 130. The first projection 134 and the second projection 135 enable the engagement jaws 132 and 133 to be disposed within the radius of rotation of the protrusions 113 and 114 by limiting the angle of rotation of the clutch ember 130 when the clutch member 130 is rotated from side to side. The first projection 134 is disposed on a side of the axis of the clutch member 130 to limit the angle of the stopper 112 rotated in the first direction, and the second projection 135 is disposed on another side of the axis of the clutch member 130 to limit the angle of the stopper 112 rotated in the second direction. The sizes of the first projection 134 and the second projection 135 are dependent on the size of the stopper 112. As the angle of rotation of the stopper 112 limited by the first and second projections 134 and 135 increases, portions of the first and second projections 134 and 135 adjacent to the stopper 112 become large, and as the angle of rotation of the stopper 112 limited by the first and second projections 134 and 135 decreases, portions of the first and second projections 134 and 135 far away from the stopper 112 become small.

The relay plate 140 is attached to a bottom surface of the clutch member 130 or a side surface of the cover 102 to be placed between the clutch member 130 and the cover 102. The relay plate 140 is structured such that first through third terminals 151, 152, and 153 of the contact terminal 150 formed on the cover 102 move in a circular path while contacting the relay plate 140. The relay plate 140 is shaped to change the electrical interconnections between the first through third terminals 151, 152, and 153 during their rotation. The relay plate 140 is made of a conductive metallic material.

The structure and operation of the relay plate 140 and the contact terminal 150 are disclosed in Korean Patent Publication No. 10-2005-0111816, entitled 'Auto Stop System for Vehicle Wiper'. That is, the contact terminal 150 includes the first through third terminals 151, 152, and 153, and the first terminal 151 and the second terminal 152 are connected to operate the driving motor and the second terminal 152 and the third terminal 153 are connected to stop the driving motor. However, the present embodiment is not limited thereto, and the first terminal 151 and the second terminal 152 may be connected to cut off the power supply and the second terminal 152 and the third terminal 153 may be connected to supply power and other modifications can be made.

The lead terminal 160 is disposed on the cover 102, and has one end connected to a power source or a circuit (not shown) and the other end connected to the first through third terminals 151, 152, and 153 of the contact terminal 150.

The operation and effect of the wiper driving apparatus for the automobile according to the present embodiment will now be explained.

Figure 7A:
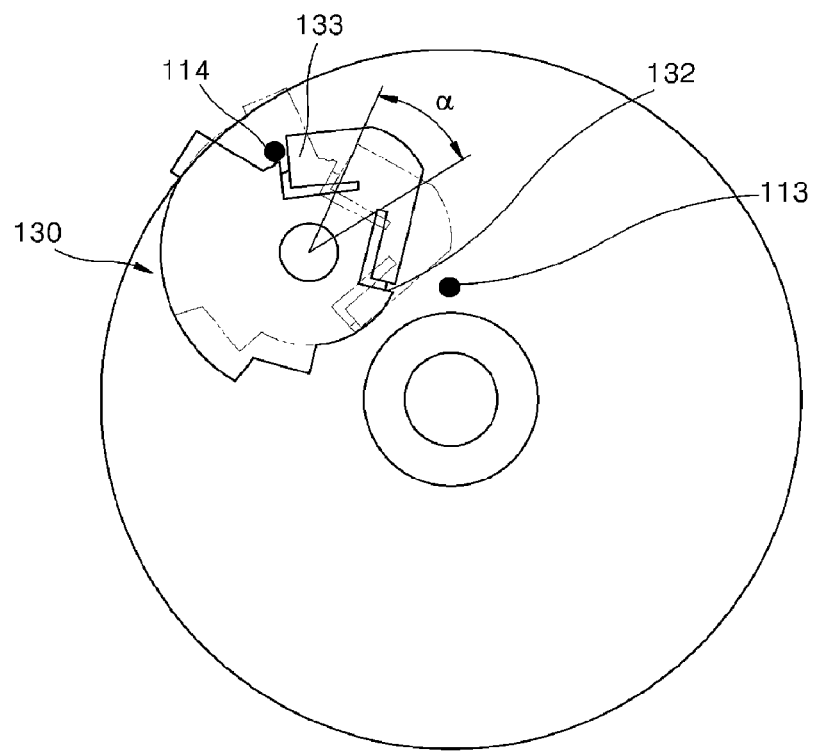
FIGS. 7A through 10B illustrate the operation of the wiper driving apparatus of FIG. 3, according to an embodiment of the present invention.
Figure 7B:
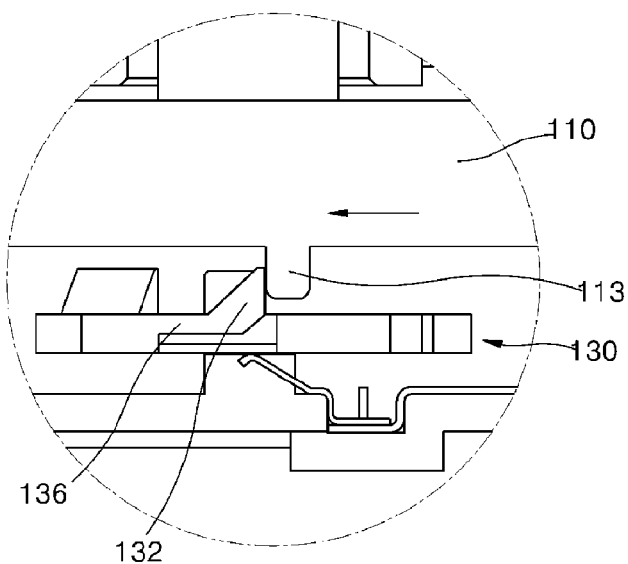

When the driver of an automobile having the wiper driving apparatus according to the present embodiment cuts off the ignition while the wiper driving apparatus is operating and before the wiper reaches the park position, the relay plate 140 and the terminals of the contact terminal 150 are in a power-on state, that is, the first terminal 151 and the second terminal 152 are connected such that power is continuously supplied to the driving motor and the worm wheel 110 continues to be rotated. The protrusion 113 rotated with the rotation of the worm wheel 110 pushes the engagement jaw 132 to rotate the clutch member 130 counterclockwise. Next, the clutch member 130 rotated counterclockwise due to the pushed engagement jaw 132 cuts the connection between the first terminal 151 and the second terminal 152 and establishes the connection between the second terminal 152 and the third terminal 153 to prevent power from being supplied to the driving motor, thereby stopping the wiper in the park position (see solid line of FIG. 7A and FIG. 7B). The wiper is in the park position when the clutch member 130 is in a state shown by the solid line. Next, when the ignition is turned on and the wiper is supplied with power, the worm wheel 110 is rotated again to operate the clutch member 130.

Figure 8A:
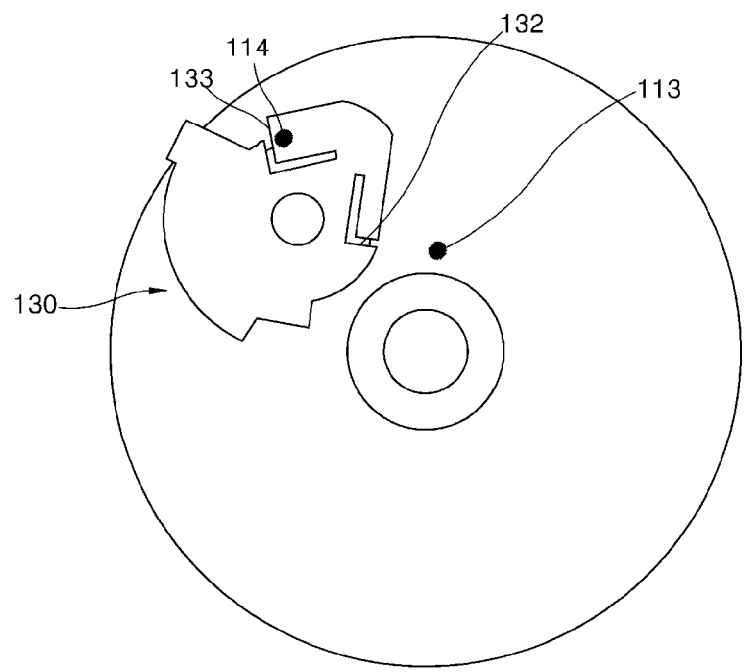
Figure 8B:
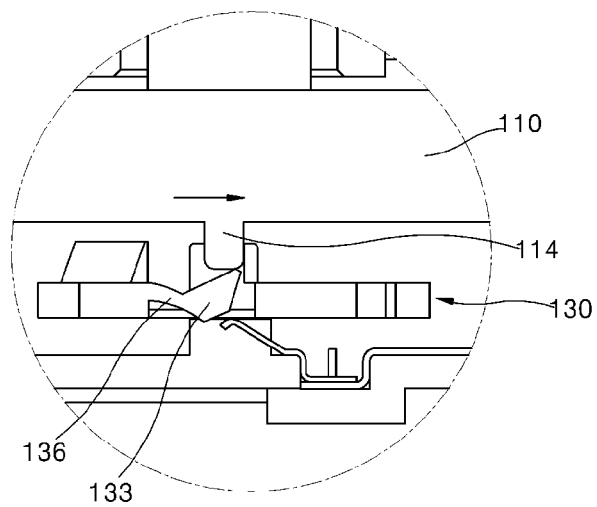
Figure 9A:
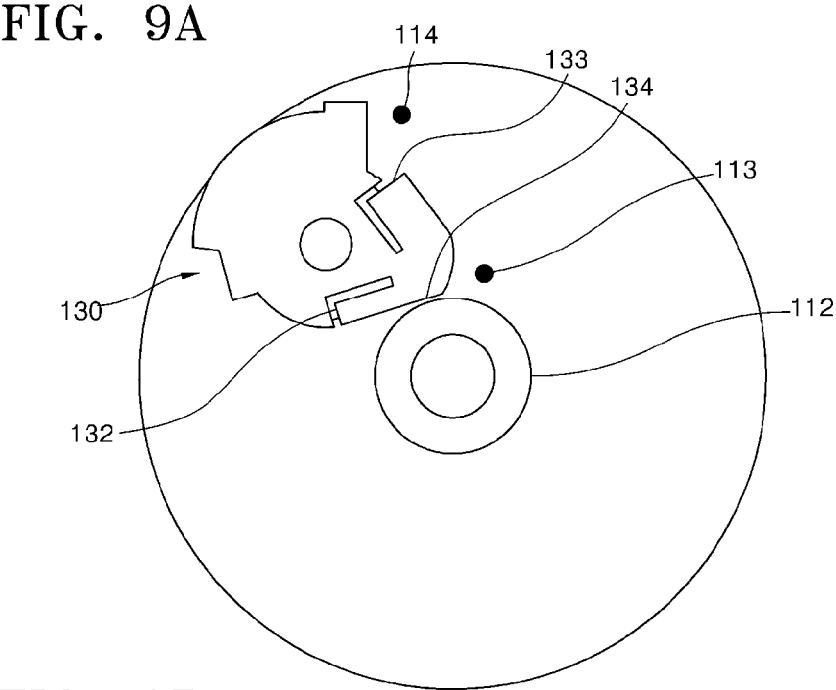
Figure 9B:
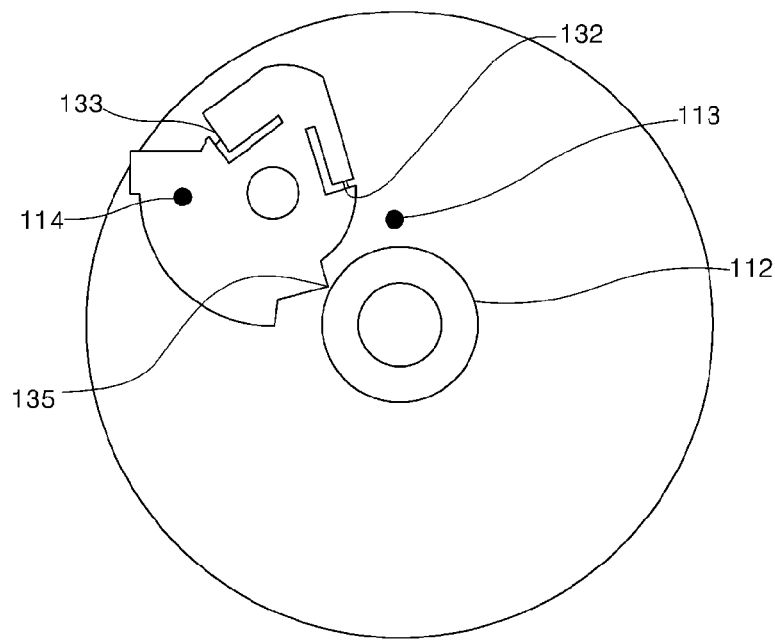

FIG. 8A illustrates the case where the motor rotates in a reverse direction due to motor or other mechanical problems, and the worm wheel 110 and the protrusions 113 and 114 are rotated counterclockwise. Referring to FIG. 8B, the protrusion 114 that is rotated counterclockwise presses the engagement jaw 132, the elastic part 136 is deformed, and the engagement jaw 132 is moved toward the cover 102. Accordingly, the protrusion 114 can be rotated clockwise past the engagement jaw 132. The engagement jaws 132 and 133 are prevented from being disposed beyond the radius of rotation of the protrusions 113 and 114 by virtue of the clutch member 130 that is maintained in place without being pushed by the protrusion 114.

Even when the clutch member 130 is rotated beyond an allowable angle a by the protrusions 113 and 114, the engagement jaw 132 of the clutch member 130 can be disposed within the radius of rotation of the protrusions 113 and 114 of the worm wheel 110 due to the stopper 112, the first projection 134, and the second projection 135. In this structure, even when the clutch member 130 is pushed by the protrusion 113 that is normally rotated clockwise, the first projection 134 contacts the stopper 112 to restrain a further rotation of the clutch member 130, thereby preventing the engagement jaw 132 from being rotated out of the radius of rotation of the protrusion 113. Also, when the clutch member 130 is pushed to be abnormally rotated counter-clockwise, the second projection 135 contacts the stopper 112 to restrain a further rotation of the clutch member 130, thereby preventing the engagement jaw 133 from being rotated out of the radius of rotation of the protrusion 113. As a result, the wiper driving apparatus of the present embodiment can protect the clutch member 130 and other elements from damage or malfunction caused by a reverse rotation or overspeed rotation due to a circuit or motor disorder, or other mechanical problems.

Figure 10A:
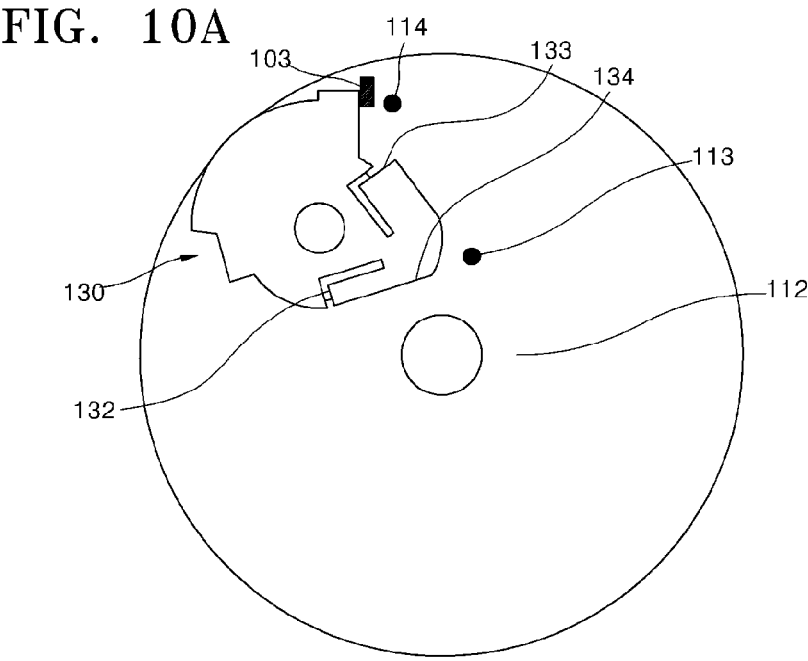
Figure 10B:
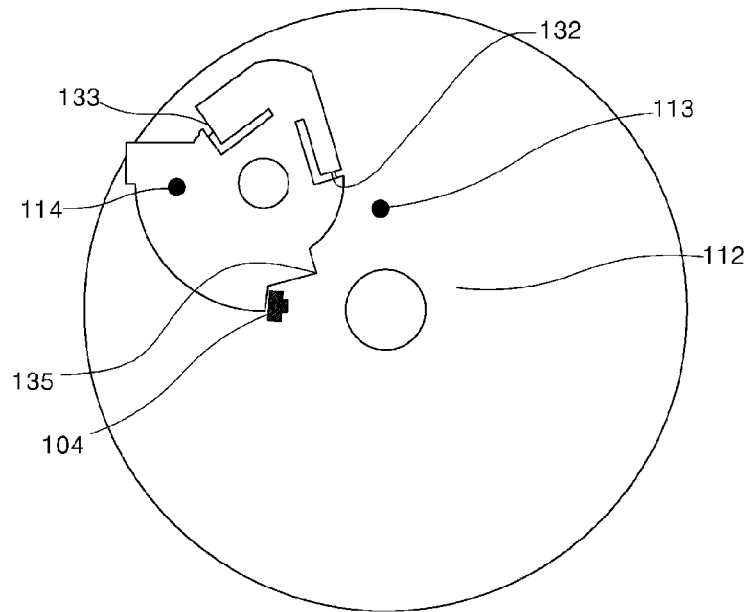

The rotation angle limiting means of the present embodiment includes the first catching projection 103 and the second catching projection 104 as well as the stopper 112 as shown in FIGS. 10A and 10B. The first catching projection 103 protrudes from the cover 102 within the rotation angle of the clutch member 130 to limit the clockwise rotation of the clutch member 130 to a predetermined angle. The second catching projection 104 protrudes from the cover 102 within the rotation angle of the clutch member 130 to limit the counterclockwise rotation of the clutch member 130 to a predetermined angle.

Mode for Invention

The present embodiment can be modified as follows without departing from the spirit and scope of the present invention.

First, although the relay plate 140 is attached to the clutch member 130 and the contact terminal 150 is disposed on the cover 102 in the present embodiment, the present invention is not limited thereto, and the contact terminal 150 may be attached to the relay plate 140 and the relay plate 140 may be disposed on the cover 102 to be connected to the lead terminal 160. In this case, as the clutch member 130 is being rotated, the contact terminal 150 moves in a circular path while contacting the relay plate 140 disposed on the cover 102.

Also, although each of the elastic parts 136 is made of plastic materials in the present embodiment, the elastic part 136 may be made of a rubber or other elastic material.

Also, although all the stopper 112, the first projection 134, the second projection 135, the first catching projection 103, and the second catching projection 104 are used as the rotation angle limiting means in the present embodiment, the respective elements may be used independently. That is, the angle of rotation of the clutch member 130 may be limited only by the stopper 112, the first projection 134, and the second projection 104, or only by the first catching projection 103 and the second catching projection 104.

As described above, the wiper driving apparatus for the automobile according to the present invention allows the reverse rotation of the protrusions by elastically deforming the engagement unit, thereby preventing the clutch member from being damaged by other parts or the engagement unit from being disposed beyond the radius of the protrusions.

Furthermore, the wiper driving apparatus can always locate the engagement unit within the radius of rotation of the protrusions and enable normal operation of the clutch member by employing the rotation angle limiting means even when the motor rotates at abnormally high speed and the clutch member is pushed by the protrusions to be rotated beyond the normal angle due to the overspeed rotation of the motor.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A wiper driving apparatus for an automobile, comprising: a housing; a driving motor; a worm wheel installed in the housing to be rotated by the driving motor, connected to a wiper arm, and having protrusions formed on a surface thereof; and a clutch member eccentric with respect to the center of the worm wheel to be rotatably installed in the housing such that power supply to the driving motor is selectively turned on or off according to the position of the rotating clutch member relative to the housing, wherein the clutch member has an engagement unit which is caught by the protrusions of the worm wheel when the worm wheel is rotated in a first direction, and is not caught by the protrusions of the worm wheel when the worm wheel is rotated in a second direction, wherein the engagement unit comprises engagement jaws caught by the protrusions of the worm wheel when the worm wheel is rotated in the first direction, and elastic parts pressed and deformed by the protrusions of the worm wheel when the worm wheel is rotated in the second direction to permit the rotation of the protrusions.

2. The wiper driving apparatus of claim 1, wherein the engagement jaws have triangular sections.

3. The wiper driving apparatus of claim 1, further comprising rotation angle limiting means for limiting the angle of rotation of the clutch member relative to the housing.

4. The wiper driving apparatus of claim 3, wherein the rotation angle limiting means comprises: a stopper disposed on the worm wheel; a first projection disposed on the clutch member, and limiting the angle of the clutch member rotated in the first direction by being caught by the stopper of the worm wheel while the clutch member is rotated in the first direction relative to the housing; and a second projection disposed on the clutch member, and limiting the angle of the clutch member rotated in the second direction by being caught by the stopper of the worm wheel while the clutch member is rotated in the second direction relative to the housing.

5. The wiper driving apparatus of claim 4, wherein the rotation angle limiting means comprises: a first catching projection protruding from the housing to catch the clutch member that is rotated in the first direction; and a second catching projection protruding from the housing to catch the clutch member that is rotated in the second direction.

6. The wiper driving apparatus of claim 3, wherein the rotation angle limiting means comprises: a first catching projection protruding from the housing to catch the clutch member that is rotated in the first direction; and a second catching projection protruding from the housing to catch the clutch member that is rotated in the second direction.

7. The wiper driving apparatus of claim 1, further comprising rotation angle limiting means for limiting the angle of rotation of the clutch member relative to the housing.

8. The wiper driving apparatus of claim 7, wherein the rotation angle limiting means comprises: a stopper disposed on the worm wheel; a first projection disposed on the clutch member, and limiting the angle of the clutch member rotated in the first direction by being caught by the stopper of the worm wheel while the clutch member is rotated in the first direction relative to the housing; and a second projection disposed on the clutch member, and limiting the angle of the clutch member rotated in the second direction by being caught by the stopper of the worm wheel while the clutch member is rotated in the second direction relative to the housing.

9. The wiper driving apparatus of claim 8, wherein the rotation angle limiting means comprises: a first catching projection protruding from the housing to catch the clutch member that is rotated in the first direction; and a second catching projection protruding from the housing to catch the clutch member that is rotated in the second direction.

10. The wiper driving apparatus of claim 7, wherein the rotation angle limiting means comprises: a first catching projection protruding from the housing to catch the dutch member that is rotated in the first direction; and a second catching projection protruding from the housing to catch the clutch member that is rotated in the second direction.

* * * * *